UNITED STATES PATENT OFFICE.

THEODORE B. WAGNER, OF CHICAGO, ILLINOIS.

BREWING MATERIAL.

No. 855,599. Specification of Letters Patent. Patented June 4, 1907.

Continuation of application Serial No. 242,305, filed January 23, 1905. This application filed January 8, 1906. Serial No. 295,052.

*To all whom it may concern:*

Be it known that I, THEODORE B. WAGNER, a citizen of the United States, residing at Chicago, in the county of Cook and State of Illinois, have invented a certain new and useful Brewing Material and Process of Making It, of which the following is a specification.

This application is a continuation of the application heretofore filed Jan. 23, 1905, Serial No. 242,305.

In the art of brewing, certain materials are generally used to replace a part of the malt and are called malt substitutes, and these consist either wholly or partly of starch. These materials are acted upon by the malt in such a way as to undergo certain chemical changes which produce from the starch maltose and malto-dextrins with small amounts of other substances. As an example of such malt substitutes, I may enumerate the so called "grits" "refined grits," rice starch, and such products as "cerealine," "frumentum," etc., all of which are well known to those skilled in the art. When these malt substitutes have not been previously cooked so as to thoroughly convert or gelatinize the starch contained in them they must be cooked before they are added to the malt in the mash tun. My new malt substitute, however, does not need cooking because it is soluble in water and is readily acted upon by the malt at the mashing temperatures commonly used in brewing.

It is well known that starch is physically and chemically altered by the action of acids, heat or ferments. This fact is availed of in the technical processes of making glucose, hydrous and anhydrous dextrose, the manufacture of liquors, both malt and spirituous, and the manufacture of dextrin, etc. The nature of the change by which dextrose is formed from starch is one of hydrolysis, that is to say, it is a process of adding water to the molecule of starch, or causing water to unite with the starch molecule. Thus the chemical formula for starch being $(C_6H_{10}O_5)_n$; that for dextrose is $C_6H_{12}O_6$ and the chemical equation may be represented as follows:

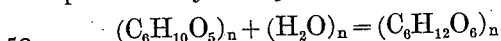

In a similar manner maltose, $C_{12}H_{22}O_{11}$ is formed from starch by combination with $H_2O$, the equation being

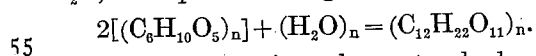

Between the point where starch, by hydrolysis, is transformed into dextrose or maltose there are found many intermediate products, such as soluble starch, amylo-dextrin, erythro-dextrin, achroo-dextrin, and the like. Whether all of these are different chemical compounds or whether some of them are to be considered as mixtures of chemical compounds is a matter of dispute, but this question does not matter so far as my new material hereinafter described is concerned.

In my new product the bulk has not been acted upon to such an extent as to produce actual hydrolysis. Chemically considered my product is intermediate between starch and glucose. It is not starch; it differs from such materials as "cerealine," "frumentum" and the like, in that the changes in the starch cells have been carried so far as to render practically the whole material soluble in cold water. It differs in physical appearance from such materials as maltose and glucose, in that it is dry, and from grape sugar of commerce in that it is wholly fermentable. My new product, containing as it does, no raw starch, being fermentable and substantially soluble in water forms an admirable material as a malt substitute in the manufacture of beer, ale, etc.

My process consists, in general, in taking starch milk obtained by mixing the farinaceous material with water, treating with acid at an elevated temperature, until traces of reducing sugars begin to appear and finally evaporating to dryness.

I prefer to use corn starch milk of a gravity of 22° Baumé, treating with muriatic acid equivalent to .15% of HCl gas of the weight of dry starch used, and heating equivalent to 20 lbs. above atmospheric pressure, for a period of 40 minutes. It will, of course, be understood that these proportions may be varied the object being to carry the treatment to the point where the reducing sugars begin to appear. In order to check their development commercial sodium, carbonate or soda ash may be used to neutralize the product. In order to determine the presence of traces of reducing sugars a sample test with Fehling's solution may be made.

The product after treatment with acid and pressure is preferably dried upon a steam heated roll, which serves as an economical means for driving off the moisture.

A convenient method of practicing my process is as follows. Take starch milk of a gravity of 22° Baumé in quantity sufficient to furnish 100 lbs. of dry starch; to this starch milk add ½ lb. of commercial muriatic acid of 18° Baumé, and run the mixture into a copper converter similar to those used in the manufacture of glucose, and in which about three gallons of boiling water has previously been introduced; introduce the starch milk gradually into the converter, while the contents is boiling. When the starch milk has all been run into the converter, the pressure is brought to about 20 lbs. and maintained until traces of reducing sugars begin to appear. This may be determined by a series of tests with Fehling's solution. As soon as this point is reached, the contents of the converter is blown off into a tank and development of the reducing sugars arrested by neutralization with commercial sodium carbonate or soda ash. For convenience the resultant product may be somewhat concentrated in a vacuum pan. It is then run into a trough which has a revolving cylinder dipping into it. This cylinder is kept heated and the material applied from the trough upon its surface. As the cylinder revolves it takes up a film of the product which dries on the heated surface of the cylinder thereby inducing further changes in the product in that during the production of a film in this manner, the dextrinization of the product progresses by its being subjected to heat and while being transformed from a liquid to a dry state, so that the material leaving the roll in a dry state has a different chemical composition from the substance of the material supplied to the roll. The dried film is removed from the cylinder by scrapers and the finished product is broken up into small flakes. The product is then ready for use.

It will be noticed that the process of making my new material is a wet process, all of the steps up to the final drying, being carried on in the presence of a considerable amount of water. The final product has substantially the following composition. Soluble starch and dextrin substances, 82.2%; moisture, 10.0%; reducing sugars, 6.4%; raw starch, none; ash and impurities of starch, 1.4%. It will, of course, be understood that this analysis may vary somewhat in different samples of my product made from different grades of starch.

My new product is distinguished from prior products of similar character in that it is substantially soluble in water at ordinary temperatures, is amorphous in that the structure of the starch cells is not visible under the microscope, shows a reduction with Fehling's solution, produces a perfect mash in its action with malt, gives a violet or purple color in its reaction with approximately one eighth its weight of iodin and a reddish brown color in its reaction with approximately two thirds its weight of iodin. My new material is not limited to its use by brewers, but it is also useful in the textile industries.

Having thus described my invention what I claim is:

1. The new product derived from starch chemically intermediate between starch and glucose, practically wholly soluble in water at ordinary temperatures, wholly fermentable and amorphous in that the structure of the starch cells is not recognizable under the microscope.

2. The new product made from starch characterized by the facts that it is amorphous, in that the structure of the starch cells is not recognizable under the microscope; gives a perfect mash when acted upon by malt, exhibits a reduction when treated with Fehling's solution; is substantially soluble in water at ordinary temperatures; gives a violet or purple color in its reaction with approximately one eighth its weight of iodin, and a reddish brown color in its reaction with approximately two thirds of its weight of iodin.

In testimony whereof I hereunto affix my signature in presence of two witnesses.

THEODORE B. WAGNER.

Witnesses:
F. L. Jefferies,
L. P. Bauer.